G. SCHNITZER,

Assignor, by mesne assignments, to THE ROYAL BAKING POWDER CO.

MANUFACTURE OF CREAM OF TARTAR.

No. 10,004. Reissued Jan. 3, 1882.

WITNESSES:

Philip J. O'Reilly.

Jam Tibby Jr

INVENTOR:

Guido Schnitzer

BY Gifford & Gifford

ATTORNEYS.

UNITED STATES PATENT OFFICE.

GUIDO SCHNITZER, OF SCHWÄBISCH HALL, WÜRTEMBERG, GERMANY, ASSIGNOR, BY MESNE ASSIGNMENTS, TO THE ROYAL BAKING POWDER COMPANY, OF NEW YORK, N. Y.

MANUFACTURE OF CREAM OF TARTAR.

SPECIFICATION forming part of Reissued Letters Patent No. 10,004, dated January 3, 1882.

Original No. 183,597, dated October 24, 1876. Application for reissue filed December 1, 1880.

*To all whom it may concern:*

Be it known that I, GUIDO SCHNITZER, of Schwäbisch Hall, in the Kingdom of Würtemberg, Germany, have invented a new and useful Process in the Manufacture of Bitartrate of Potash, popularly known as "Cream of Tartar;" and I do hereby declare that the following is a full, clear, and exact description thereof, reference being had to the accompanying drawings, making a part of this specification.

In manufacturing cream of tartar argols are used. These argols, as is well known, consist essentially of bitartrate of potash, tartrate of lime, and various organic and mineral substances in varying proportions.

In the ordinary methods of manufacturing cream of tartar heretofore used the argols were placed in boiling water, the bitartrate of potash of the argols was dissolved in said water, the tartrate of lime of the argols was largely dissolved in the solution of bitartrate of potash, and the organic and mineral substances remained substantially undissolved except the coloring-matters contained in them. The solution of bitartrate of potash and tartrate of lime was then allowed to crystallize; but the resulting crystals, instead of containing only pure bitartrate of potash, contained also considerable quantities of tartrate of lime. A certain amount of tartrate of lime was left undissolved. A certain amount of tartrate of lime was therefore contained in the product and a certain amount left in the residuum. In carrying on the old method above mentioned the argols were dissolved in the water in an open vessel by the action of heat. Instead of these open vessels, I employ a closed vessel, the contents of which are kept under pressure while the dissolving of the argols proceeds, and by using hydrochloric acid and chloride of potassium in the solution I convert the tartrate of lime into bitartrate of potash, thereby transforming the tartrate of lime, which would otherwise remain in the solution of argols as an impurity, and also increasing very much the product of cream of tartar.

Figure 1:
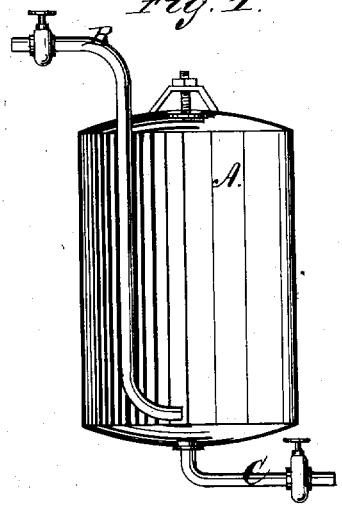
Figure 2:
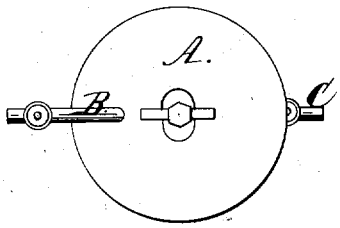

Figure 1 represents a vertical section of the copper or copper-lined cylinder used in the process with steam and exhaust pipes. Fig. 2 represents a transverse section thereof, and shows the top and man-hole.

I use in my process a copper or copper-lined cylinder, preferably placed and maintained in an upright position. (Seen in Fig. 1.) This cylinder may be of any size; but I prefer that it should be about four and a half ($4\frac{1}{2}$) feet in diameter by six and a half ($6\frac{1}{2}$) feet in height. At the top of this cylinder is a man-hole of sufficient size to allow easy ingress and egress. The man-hole plate must be so fastened as to be able to sustain the requisite pressure to be maintained in the boiler and to be steam-tight. A steam-pipe, B, Fig. 1, leading from a steam-boiler, passes into the cylinder. From the bottom of the cylinder or boiler another pipe, C, Fig. 1, extends for the purpose of removing any insoluble or foreign matter that may settle after the crystallization of the cream of tartar has taken place.

The advantages and merits of my process over any and all others now known or used are that by my process a much larger percentage or proportion of the argols can be and are dissolved; the crystals obtained are larger and finer; the product of the bitartrate of potassa is greater and mixed with very few impurities, thus supplying a very pure bitartrate of potassa at a lower cost.

Having described the apparatus and some of the advantages of my process, I will now proceed to describe my process and the manner in which I prefer to work it more fully.

The amount of argols to be treated in a given cylinder will depend upon the size of the cylinder; but I prefer to use about a thousand pounds of argols in a cylinder of the size above given.

I first place in the cylinder A an amount of water sufficient (under the treatment of steam) to dissolve the argols to be used, which will be sufficient water to about half fill the cylinder. I then add to the water in the cylinder the argols, and also the requisite equivalents of hydrochloric acid, ($HCl$,) of requisite gravity and chloride of potassium ($KCl$) the amount of argols, as before stated, being regulated by the size of the cylinder. The cylinder is then closed and steam under pressure is admitted through pipe B, Fig. 1, and so maintained for about three (3) hours, more or less. The pipe B, being extended to near the bottom of the cylinder, as shown in Fig. 1, will cause the entrance of the steam to agitate the contents of the cylinder. The steam-supply being turned off, the cylinder and contents are allowed to remain till the crystallization of the bitartrate of potassa is complete, which usually takes about three (3) days. The crystals of bitartrate of potassa deposited in the cylinder are removed through the man-hole shown in Fig. 2. The "mother-water" is drawn off, by means of a siphon or otherwise, into another vessel at R, Fig. 1. If this mother-water is not sufficient to dissolve the new charge of argols, the necessary amount of water is to be added. Thus all undissolved tartrate of lime and uncrystallized bitartrate of potassa are saved and utilized. The insoluble and foreign matter deposited at the bottom of the cylinder A may be removed by means of pipe C, Fig. 1, or otherwise.

By adding the necessary amount of animal charcoal and pipe-clay all coloring-matter will be removed from the bitartrate of potassa, making the product very pure.

It will be noticed that this process differs essentially from those hitherto employed, in that I do not effect the solution of the argols by ordinary boiling nor by heating by means of a steam-jacket. By either of these methods a much longer time was required to effect the solution of the argols and the chemical changes.

Having thus described my invention, what I claim, and desire to secure by Letters Patent, is—

1. The improvement in the art of treating argols to obtain a solution of the same, which consists in subjecting the argols while being dissolved to the pressure of steam, substantially as described.

2. The improvement in the art of treating argols to obtain a solution of the same, which consists in subjecting the argols while being dissolved to the pressure of steam admitted near the bottom of the vessel containing the argols, substantially as described.

3. The improvement in the art of obtaining cream of tartar from argols, which consists substantially of dissolving the argols in water under steam-pressure, converting the tartrate of lime into bitartrate of potash by the aid of hydrochloric acid and chloride of potassium, and separating the cream of tartar after it has crystallized from the residual solution, substantially as described.

4. The process herein described of manufacturing cream of tartar by subjecting ground argols, together with hydrochloric acid and chloride of potassium, in a steam-tight vessel, to the direct action of compressed steam for the necessary length of time, and then allowing the solution to stand till the crystallization of the bitartrate of potassa is complete, substantially in the manner specified.

GUIDO SCHNITZER.

Witnesses:

Professor Dr. A. WINFFERLIN, *Bibliothekar.*

Prof. Dr. G. FAEGER.